(12) United States Patent
Calley

(10) Patent No.: US 9,261,078 B2
(45) Date of Patent: *Feb. 16, 2016

(54) STALL CONTROLLER AND TRIGGERING CONDITION CONTROL FEATURES FOR A WIND TURBINE

(71) Applicant: XZERES CORP., Wilsonville, OR (US)

(72) Inventor: David Gregory Calley, Flagstaff, AZ (US)

(73) Assignee: XZERES CORP., Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/168,623

(22) Filed: Jan. 30, 2014

(65) Prior Publication Data

US 2014/0145441 A1     May 29, 2014

Related U.S. Application Data

(60) Continuation of application No. 13/550,265, filed on Jul. 16, 2012, now abandoned, which is a continuation of application No. 12/497,086, filed on Jul. 2, 2009, now Pat. No. 8,247,914, which is a division of application No. 12/181,108, filed on Jul. 28, 2008, now Pat. No. 7,573,146, which is a division of application No. 11/487,343, filed on Jul. 17, 2006, now Pat. No. 7,420,288.

(60) Provisional application No. 60/760,407, filed on Jan. 20, 2006.

(51) Int. Cl.
| | |
|---|---|
| F03D 9/00 | (2006.01) |
| H02P 9/04 | (2006.01) |
| F03D 7/02 | (2006.01) |
| F03D 7/04 | (2006.01) |

(Continued)

(52) U.S. Cl.
CPC .......... *F03D 7/0256* (2013.01); *F03D 7/0272* (2013.01); *F03D 7/042* (2013.01); *H02P 3/22* (2013.01); *H02P 3/24* (2013.01); *H02P 9/04* (2013.01); *H02P 9/08* (2013.01); *H02P 25/18* (2013.01); *F05B 2270/1016* (2013.01); *H02P 2101/15* (2013.01); *H02P 2101/45* (2013.01); *Y02E 10/721* (2013.01); *Y02E 10/723* (2013.01)

(58) Field of Classification Search
CPC ..... F03D 7/0256; F03D 7/042; F03D 7/0272; F03D 7/02; H02P 3/24; H02P 25/18; H02P 2101/15; H02P 3/22; H02P 9/08; H02P 9/04; H02P 2101/45; F05B 2270/1016; Y02E 10/721; Y02E 10/723
USPC ................. 290/43, 44, 54, 55; 322/37, 29
See application file for complete search history.

(56) References Cited

U.S. PATENT DOCUMENTS

| | | | | |
|---|---|---|---|---|
| 6,703,718 | B2 * | 3/2004 | Calley et al. | ..... 290/44 |
| 7,420,288 | B2 * | 9/2008 | Calley | ..... 290/44 |

(Continued)

*Primary Examiner* — Javaid Nasri

(57) ABSTRACT

Control features for a wind turbine that control the turbine over a range of wind speeds and under triggering conditions with reduced noise, cost, and reliability issues associated with other such controls. Control is accomplished via control electronics, which adjust the torque produced by the electrical output generation device (e.g., alternator) within the wind turbine. During normal operation, torque is adjusted for optimum aerodynamic performance and maximum output of power. In winds above rated power, the control circuit regulates torque to lower aerodynamic performance, as necessary to maintain desired power level output. In triggering conditions, such as during simultaneous control circuit failure and loss of some portion of the electrical output generation device in extreme winds, wind turbine control is accomplished by increasing torque (e.g., via a separate controller) from the electrical output generation device via shorting of windings, so as to cause retardation of blade rotation.

5 Claims, 8 Drawing Sheets

(51) Int. Cl.
*H02P 3/22* (2006.01)
*H02P 3/24* (2006.01)
*H02P 9/08* (2006.01)
*H02P 25/18* (2006.01)
*H02P 101/15* (2015.01)
*H02P 101/45* (2015.01)

(56) References Cited

U.S. PATENT DOCUMENTS 7,573,146 B2 * 8/2009 Calley ............................ 290/44
8,018,081 B2 * 9/2011 Calley ............................ 290/44
8,247,914 B2 * 8/2012 Calley ............................ 290/44

* cited by examiner

STALL CONTROLLER AND TRIGGERING CONDITION CONTROL FEATURES FOR A WIND TURBINE

This application is a continuation of Ser. No. 13/550,265, filed Jul. 16, 2012, now abandoned, which was a continuation of Ser. No. 12/497,096, filed Jul. 2, 2009, now U.S. Pat. No. 8,247,914, which is a divisional of U.S. patent application Ser. No. 12/181,108, titled "STALL CONTROLLER AND TRIGGERING CONDITION CONTROL FEATURES FOR A WIND TURBINE, filed Jul. 28, 2008, now U.S. Pat. No. 7,573,146 which is a divisional of U.S. patent application Ser. No. 11/487,343, titled "STALL CONTROLLER AND TRIGGERING CONDITION CONTROL FEATURES FOR A WIND TURBINE" filed Jul. 17, 2006, now U.S. Pat. No. 7,420,288, which claims priority to Provisional Patent Application Ser. No. 60/760,407 titled "STALL CONTROLLER AND BACKUP FOR A WIND TURBINE" filed Jan. 20, 2006, the entirety of which is incorporated herein by reference.

BACKGROUND OF THE INVENTION

1. Field of the Invention

The present invention relates generally to stall controlling features for a wind turbine that is capable of varying torque via an alternator to cause or induce aerodynamic stall in coupled wind turbine blades. In particular, the wind turbine controller of the present invention includes stall controlling features that enable generation of stall torque under both normal conditions and upon certain triggering conditions occurring, so that in the event of a failure in the windings of the alternator or connectors thereto, or to the controller, sufficient torque remains available in the alternator to control the wind turbine.

2. Background of the Related Art

It is known in the art to provide small scale wind turbines for commercial and residential use. Problems with these existing turbines include, but are not limited to, the need to control power, especially in low and high wind conditions, and to provide features to address regulatory and other requirements and needs for stopping or slowing turbine blade rotation under certain triggering conditions, such as in the event of high winds combined with control system failure and/or failure of at least some portion of alternator windings.

To meet the need to control power output, it is known to provide stall control through the use of control electronics, which adjust the torque of the alternator in differing wind conditions. Such control electronics and operation is described further in applicant's U.S. Pat. No. 6,703,718 titled "WIND TURBINE CONTROLLER," the entirety of which is incorporated herein by reference.

Prior art solutions to the problem of stopping turbine blade rotation in emergency conditions have included use of blade furling to reduce blade rotation speed in extreme winds and mechanical braking or other use of mechanical backup devices that operate in the event of control system failure and other emergency conditions.

Problems with such prior art mechanical approaches to stopping or reducing blade rotation speed in such conditions have included increased noise (e.g., due to blade "fluttering" or excess noise when furling is used), and increased complexity and cost for such devices and systems. These devices increase complexity and decrease reliability. Among other things, there remains an unmet need in the art for systems, methods, and devices for operation in such triggering conditions, which meet regulatory and other needs and requirements, but which minimize noise and do not add significant complexity, loss of reliability, or cost to wind turbines. There is a further need for wind turbines that meet such triggering condition needs, and that also include features to allow efficient operation over a range of wind conditions.

SUMMARY OF THE INVENTION

The control features for a wind turbine of the present invention permit control of the turbine in a full range of wind speeds, as well as to slow or stop turbine rotation in triggered conditions, including conditions in which multipole failures occur in the wind turbine's toque generation generator/alternator and electronic controls therefore, without the noise, cost, or reliability issues associated with furling, pitch regulation, or aeroelastic twist regulation, for example, of the prior art. These control features of the present invention are accomplished via control electronics, which adjust the torque produced by the alternator or other electrical output generation device having a plurality of windings. During normal wind conditions, torque is adjusted for optimum aerodynamic performance and/or maximum output of the wind turbine. In winds above a selected power, the control circuit regulates torque to lower aerodynamic performance, as necessary to maintain a desired power level. In triggered conditions, such as when one or more of control circuit failure, loss of some portion of the windings of the electrical output generation device, or the presence of extreme wind conditions, wind turbine control (e.g., slowing or stopping of the wind turbine blades) is accomplished by increasing torque from the electrical output generation device via a shorting or other increase in current based torque (e.g., pulse width modulation or PMW) of windings (collectively also hereinafter interchangeably referred to as "shorting"), so as to cause the electrical output generation device to function as a brake on or otherwise retard turbine blade rotation. In one embodiment, if the primary control has failed, a secondary control shorts or otherwise increases current in the alternator/generator so as to cause the blades to stall, thereby slowing or bringing the wind turbine to a stop.

The triggering event sensing and/or control features of some embodiments of the present invention comprise separate circuitry from the normal operation of the sensing and/or control circuit for the wind turbine, so as to reduce or eliminate safety concerns associated with failure of the normal operation control circuit. Other embodiments incorporate such triggering event control features within the normal operation control circuitry. The triggering event control features may include a relay that is normally open or normally closed, for example, so long as, upon a triggering event occurring, the control features automatically operate for shorting at least one of the electrical output generation device windings. In embodiments using a relay that is normally open, for example, upon the emergency condition occurring, a signal relay is activated so as to provide power (e.g., from a charged capacitor) to close the relay, thereby shorting the windings. In embodiments using a relay that is normally closed, for example, upon the emergency condition occurring, a power supply to maintain an open condition of the relay is removed, thereby allowing the relay to return to its normally closed condition.

The presence of the triggering event may be determined, for example, via devices and methods for monitoring the rotational speed of the turbine blades, output of the alternator, whether any of the windings of the electrical output generation device, or connectors thereto, are inoperable, and whether any of the normal wind turbine control electronics are malfunctioning. One or more operations of the control electronics or other features of the wind turbine of the present invention may be provided wirelessly.

Additional advantages and novel features of the invention will be set forth in part in the description that follows, and in part will become more apparent to those skilled in the art upon examination of the following or upon learning by practice of the invention.

DETAILED DESCRIPTION

Figure 1:
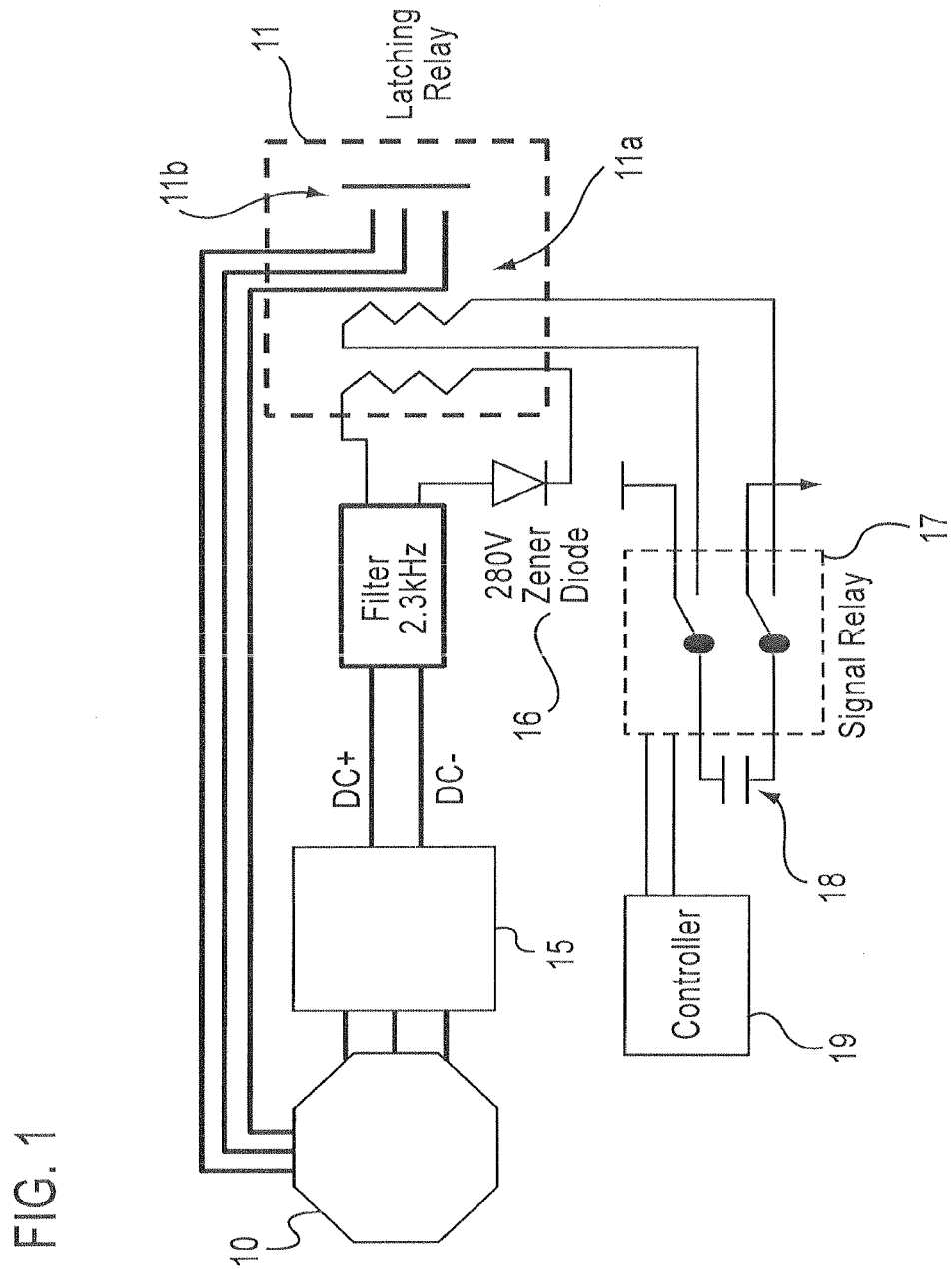
FIG. 1 contains a representative diagram of backup elements for a back up control circuit of an exemplary wind turbine, in accordance with an embodiment of the present invention.

The wind turbine controller of the present invention, portions of an exemplary variation of which are shown in FIG. 1, includes an electrical output generation device 10, such as an alternator or a generator, and associated circuitry that provides backup control and triggering event control features for the blades of the wind turbine. The device 10 may also include circuitry for normal operational control (not shown in FIG. 1; see e.g., FIG. 6). The exemplary circuit includes an alternating to direct current (AC to DC) converter, such as a rectifying bridge, a DC to DC converter, and a DC to AC converter. In addition, as shown in FIG. 1, the controller includes triggering event control features, such as a winding shorting device 11, (e.g., a latching relay), that provides shorting of the alternator windings to retard wind turbine motion upon triggering events occurring, such as emergencies. Such winding shorting device 11 may operate, for example, in the condition of extremely high winds after the primary circuit has failed. In one embodiment, the alternator 10 is designed such that its windings include at least two separably operable winding sections and such that, in the event of failure of one or more (but less than all) of the sections (e.g., due to creation of an open circuit in such windings, such as may result from a lightening strike or mechanical damage, or due to failure of a connector to a winding), and the occurrence of a triggering event, such as failure of the primary control circuit (see e.g., FIG. 6), a minimum number of unfailing sections of windings are able to generate sufficient torque to slow or halt wind turbine blade rotation, such that the turbine is rendered safe from runaway rotation or damage to its components, via shorting.

In the particular example shown in FIG. 1, the triggering event control features constitute a separate printed circuit board (PCB) or other module from other electronics for maximum fail-safe isolation.

In FIG. 1, the PCB contains a bridge rectifier 15 and a voltage-tripped relay 11. This circuit enacts shutdown of the turbine in the event of a fault in the primary control circuit. In the embodiment of FIG. 1, a voltage based triggering device 16, such as a 280V Zener diode, causes the relay 11 to activate at a predetermined voltage level. For example, in FIG. 1, the Zener diode causes a 12V coil 11a in the relay 11 to actuate at approximately 290V. This voltage corresponds to the output of a single winding of an alternator at approximately 380 revolutions per minute (RPM), in one exemplary turbine. Once the coil 11a is activated, the contacts 11b of the relay 11 provide shorting of the output of the turbine, creating more than sufficient torque under predetermined conditions (e.g., some number of windings, or connectors thereto, in open circuit condition) to bring the turbine to a stop or to slow its speed to a satisfactory (e.g., safe) level. Once activated, only a willing microprocessor and an approving user can unlatch the relay, for example. Another feature shown in FIG. 1 is a 2.3 kHz filter, which prevents momentary voltage spikes from inadvertently activating the relay 11.

The safety relay system shown in FIG. 1 also includes a signal relay 17 for driving the safety relay coils 11a. A charged capacitor 18 is switched onto the relay coils 11a, effectively isolating the relay's coils from the microprocessor of the turbine. This action may occur, for example, after the controller 19 determines the operational status of the primary circuit, such as that failure has occurred and/or other triggering event conditions for shutdown have been met. The use of a signal relay 17 and a capacitor 18 to supply activation power for the latching relay 11, which are electrically isolated from other turbine circuit components, provides an added level safety in the event of primary circuit failure.

The exemplary embodiment for triggering event control features shown in FIG. 1 includes a normally open latching relay. Occurrence of a predetermined triggering event or events causes operation of a signal relay, which in turn allows voltage supplied from a capacitor to activate closing of the latching relay. A normally closed latching relay may also be used, as well as other devices, systems, and methods, so as to cause the shorting of the windings under appropriate conditions.

Figure 2:
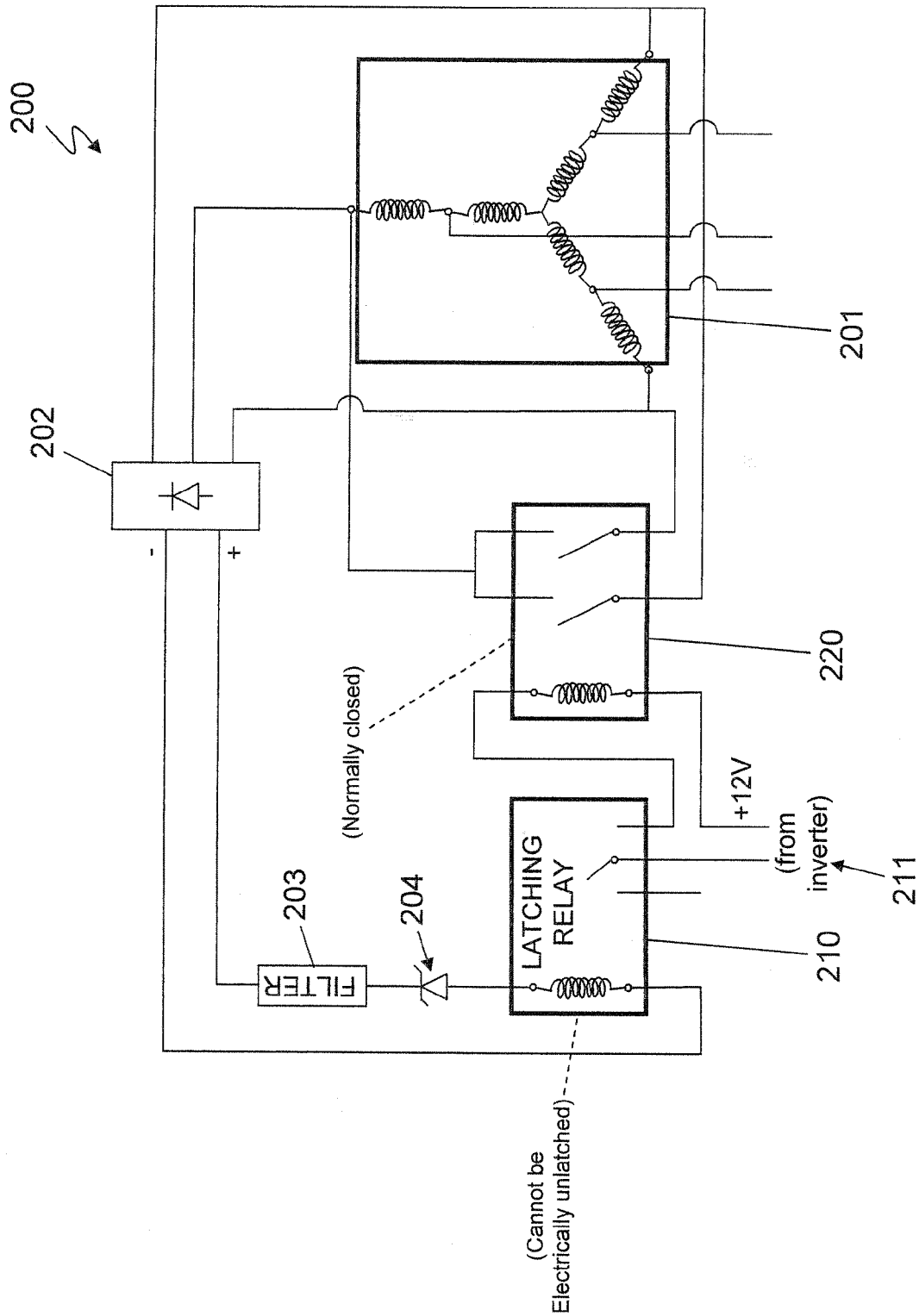
FIG. 2 shows a circuit diagram for an exemplary latching circuit for back up control for use in accordance with embodiments of the present invention.

FIG. 2 shows a circuit diagram for an exemplary latching circuit for use in accordance with embodiments of the present invention. The circuit elements 200 shown in FIG. 2 include shutdown components constituting a circuit path that is independent of any power generation circuitry associated with the output of an alternator or other power electrical output generating device (e.g., six phase winding device 201 of FIG. 2) associated with the wind turbine of the present invention. Further, the circuit elements 200 shown in FIG. 2 do not include or rely upon any complex controls, such as a computer chip or other processing elements or logic for operation.

In FIG. 2, the outputs of each of the ends of the six phase winding device 201 are connected to a three phase bridge rectifier 202. The positive output of the three phase bridge rectifier 202 is connected in series to a filter 203, such as a capacitor, dielectric, and/or inductor, or other device to filter current or voltage spikes or other momentary high output of the rectifier 202. The filter 203 is connected in series with a diode 204, such as a zener diode. The diode 204, in turn is connected in series to a latching relay 210, which is normally open and cannot be electrically unlatched. The diode 204 is connected, for example, to a coil or other inductor within the relay 210, and, as shown in FIG. 2, a single pole, double throw switch within the relay 210 is shown as not latched to either terminal.

The latching relay 210, once triggered, cannot be unlatched. Thus, for example, if the latching relay is triggered in a shutdown condition (e.g., the single pole, double throw switch latches to one of the terminals, such as due to the occurrence of a high voltage or high current event), the relay 210 will not become unlatched following the end of the triggering event (e.g., the ending of the high voltage or high current event). Thus, for example, return of the device to the manufacturer or other evaluating party must occur to address any damage to the wind turbine prior to continued operation of the wind turbine. The filter 203 and diode 204 operate to ensure that momentary current or voltage spikes or other momentary high output of the rectifier 202 that do not reflect failure conditions do not latch the relay 210 and thus inappropriately prevent operation of the wind turbine.

A second relay 220, which, for example, is normally closed, is designed and connected within the circuit 200, such that normal input from the inverter 211 (e.g., +12 V shown in FIG. 2, reflecting a control or power signal from a computer or other processor or similar device for operating the wind turbine) will not allow the relay 220 to close under normal operating conditions, and the relay 220 will not open in the continued presence of input, or following restoration of input, from the inverter 211 following a shutdown condition occurring.

Figure 3:
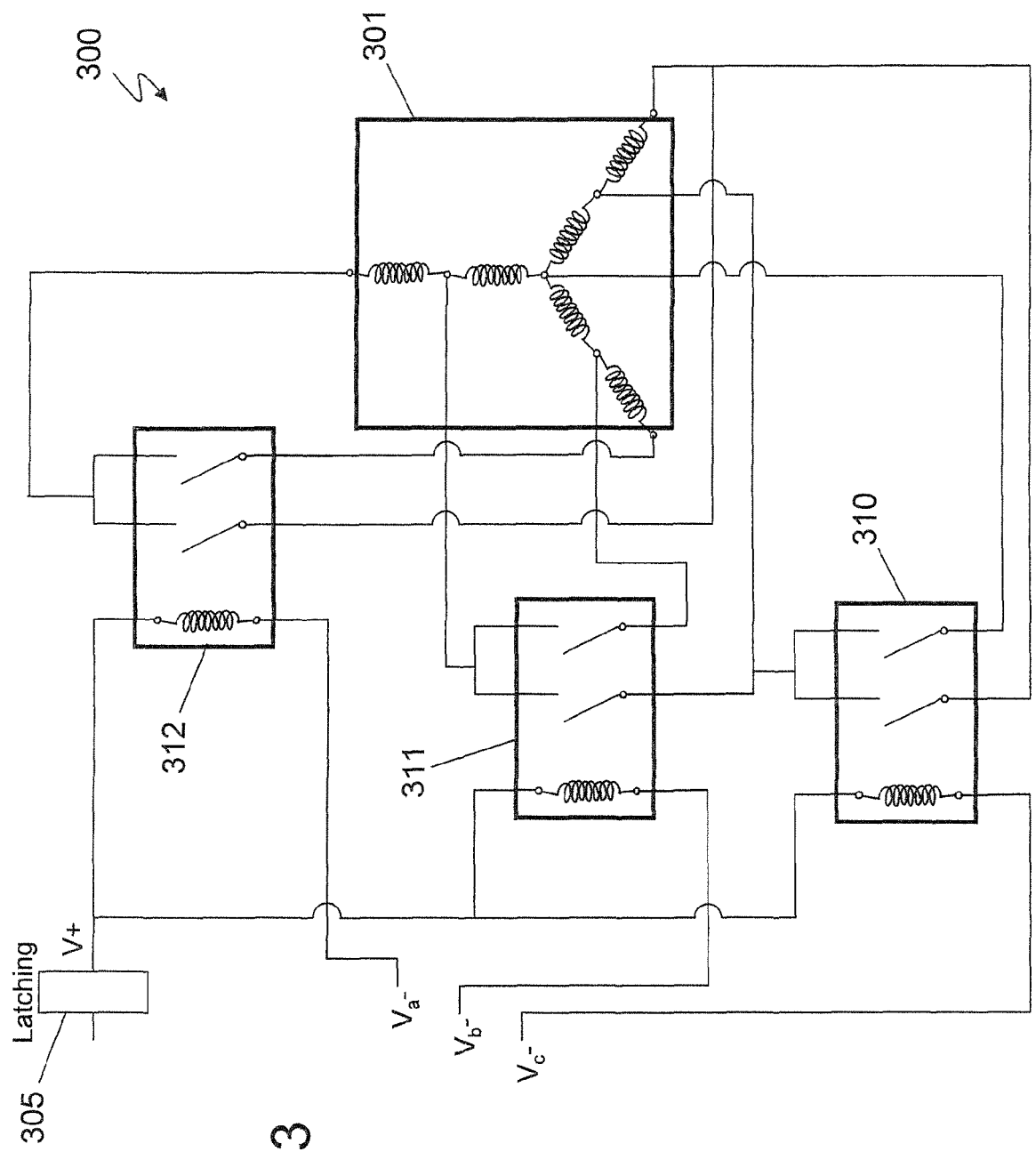
FIG. 3 shows a circuit diagram containing additional details relating to the exemplary latching circuit of FIG. 2.

FIG. 3 shows a circuit diagram of additional features for the exemplary latching circuit of FIG. 2, and the circuit 300 of FIG. 3 is similar in operation to the circuit 200 of FIG. 2. In FIG. 3, the circuit element 305 represents a latching relay similar to the latching relay 210 of FIG. 2. Three relays 310, 311, and 312 are connected to the outputs of each of the ends of power electrical output generating device 305 (e.g., the ends of each of the six phase windings of an alternator). The use of one of the three relays 310, 311, 312 for each of the pair of windings of the generating device 305 allows redundancy in shutdown control to be provided, regardless of type of failure (e.g., open or short) that may occur in any one (or more) of the windings of the generating device 301 or any one (or two) of the normally closed relays 310, 311, 312.

Figure 4A:
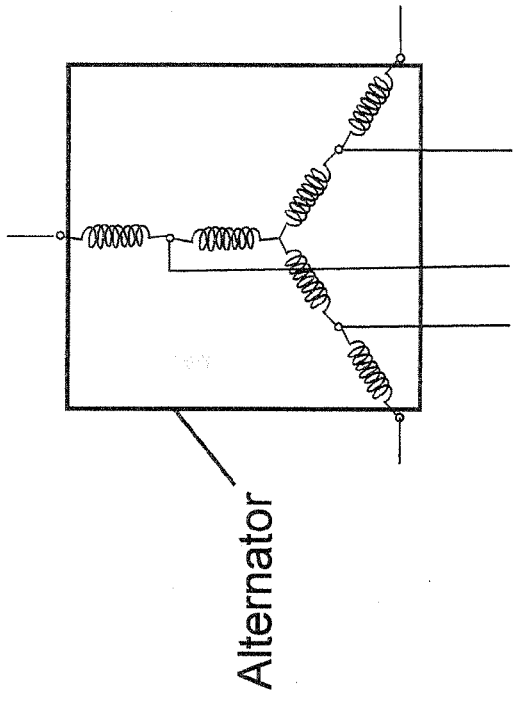
FIGS. 4A-4D show exemplary variations of six winding alternators usable with the present invention.

FIGS. 4A-4D show variations of six winding alternators usable with the present invention. FIG. 4A presents an exemplary six winding alternator having six phases and seven connection points. In the alternator of FIG. 4A, each of the six phases are out of phase from all others. In the alternator of FIG. 4A, a number of connection points or windings could fail (e.g., the connection points or windings could become open circuit portions as a result of a catastrophic event, such as a lightning strike of the alternator), and yet the alternator could still be stopped using the winding shorting device to provide shorting for the remaining windings (e.g., two of the six windings remaining functional).

Figure 4B:
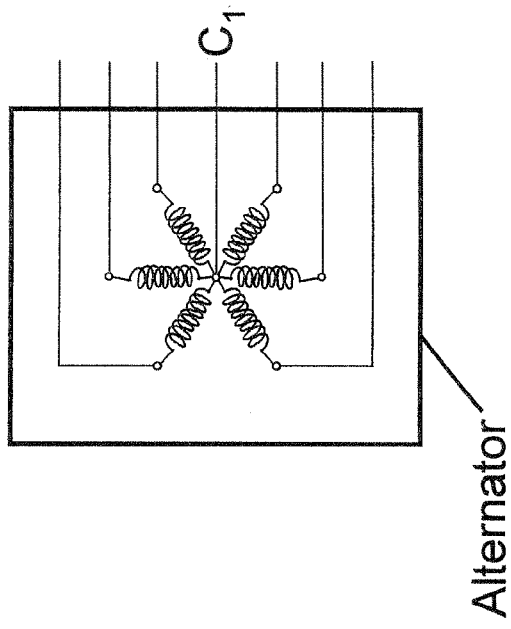

The exemplary alternator of FIG. 4B also includes six windings, but in two pairs of three phase windings operating in parallel. Thus, in this exemplary alternator, only a three phase output is produced. Alternatively to separate center connection points $C_2$ and $C_3$ for this alternator, the center connection points $C_2$ and $C_3$ may also be connected, so as to effectively constitute only a single center connection point. As with the alternator of FIG. 4A, in the embodiment of FIG. 4B, a number of the windings, such as four, may fail, and yet the alternator may still be stopped using the winding shorting device to provide shorting for the remaining windings.

Figure 4C:
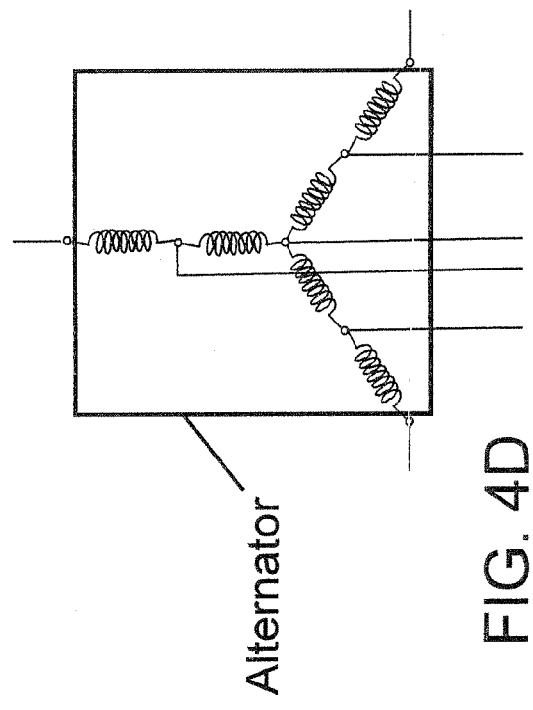

Similarly to FIG. 4B, the exemplary alternator of FIG. 4C includes six windings in three phases. In this variation, centerpoints of each winding leg separate the windings into six sections. As with the alternators of FIGS. 4A and 4B, in the embodiment of FIG. 4C, a number of the windings, such as four, may fail, and yet the alternator may still be stopped using the winding shorting device to provide shorting of the remaining windings.

Figure 4D:
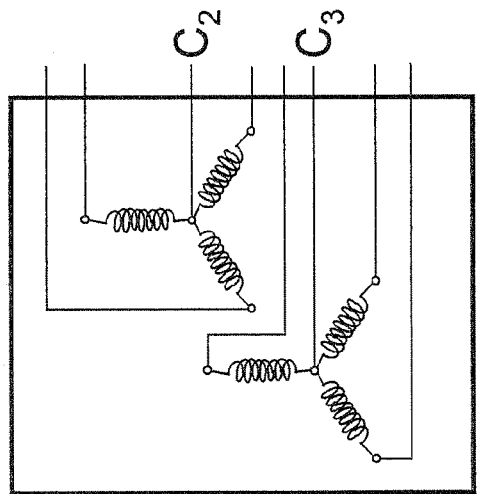

FIG. 4D shows an exemplary alternator similar to that of FIG. 4C, but including a center point connection, in accordance with an embodiment of the present invention.

Figure 5:
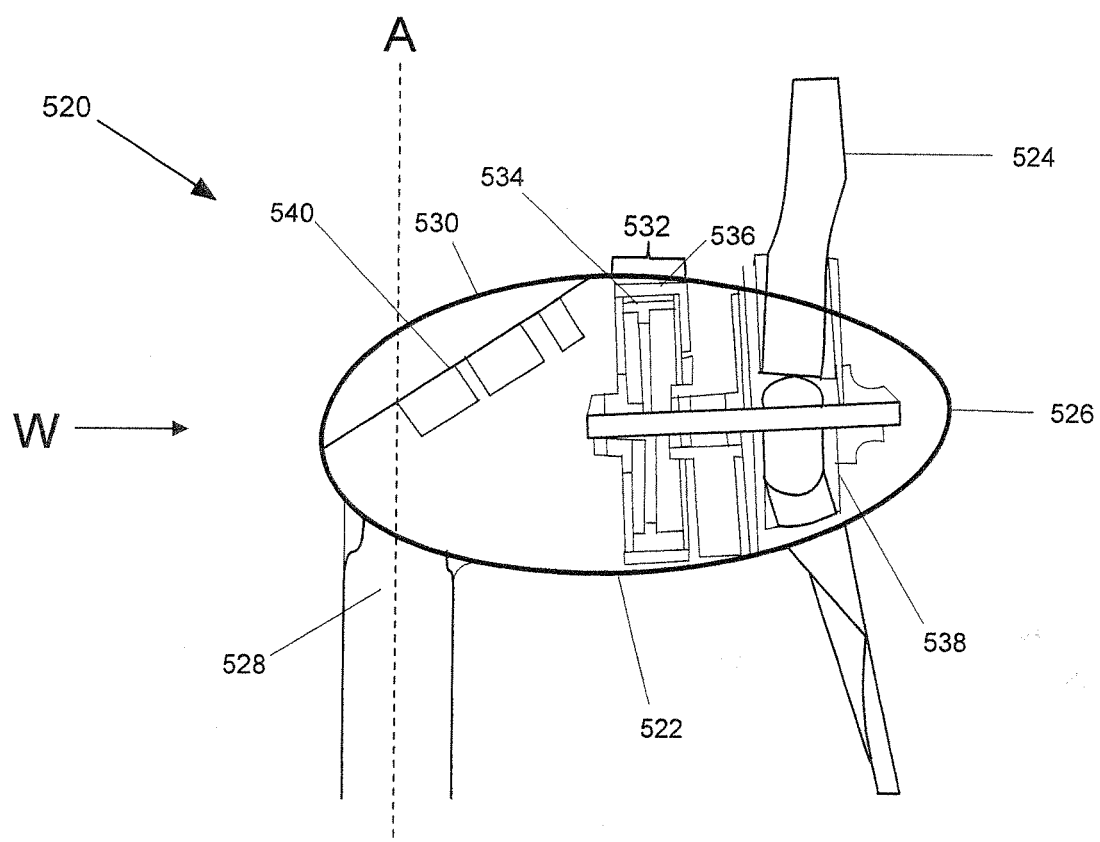
FIG. 5 shows an exemplary wind turbine, in accordance with an embodiment of the present invention.

FIG. 5 contains a cross-sectional view of various components of an exemplary wind turbine usable in accordance with embodiments of the present invention. As shown in FIG. 5, the wind turbine 520 generates power with an alternator 532. The alternator 532 of some embodiments includes a magnet rotor 534 and a slotless stator 536, as shown in FIG. 5. The stator 536, for example, is comprised of steel or other suitable core material with copper windings and/or another suitable conductor material for windings, and is attached to the housing 522. The rotor 534 rotates with rotation of the blades 524. The rotor 534 generates a varying magnetic field, such as through rotation of permanent magnets or other magnetic field sources incorporated in or attached to the rotor 534. The use of permanent magnets in these embodiments is especially useful in small-scale wind turbines, such as those used for battery charging and residential power. This approach also eliminates the need to add redundancy to a field excitation circuit, such as may be necessary with a wound electromagnet field. The stator 536 of the turbine 520 shown in FIG. 5 is slotless and, when assembled, comprises a cylindrical shape made up of steel (or other suitable materials) laminations or segments, with a copper or other suitable conductor winding. When the magnetic fields of the rotor 534 are rotated relative to the windings of the stator 536, a current is induced in the windings from the resulting change in flux as the magnetic fields associated with the rotor pass the stator winding loops. Although this variation of the present invention's stator has a slotless design, the invention can be used with other stator designs. Some common stator designs contain a number of windings, typically making up three inductor portions, for three-phase output. As is clear from this description, some aspects of the invention can function equally well with other types of generators, such as induction generators, instead of those using permanent magnet sources for the rotor magnetic fields. If an electromagnet field is used, for example, a backup circuit to energize the field may be needed.

In the variation of the present invention shown in FIG. 5, an AC to DC converter, DC to DC converter, and a DC to AC converter and/or other components 540 are located at one end of and within the housing 522 and attached to the removable hatchcover 530 to maximize the cooling effects of air or other fluid flowing against or otherwise contacting the housing 522, to minimize costs, and to shield the components from radiofrequency (RF) radiation, among other things. As the wind passes the housing 522, heat generated from the hatchcover components 540 of the wind turbine 520 is drawn away. In some embodiments, the hatchcover 530 is formed from a highly heat-conductive material, such as aluminum, and the hatchcover components 540 are placed in direct contact with the hatchcover 530 to facilitate heat transfer. While the hatchcover components 540 of the exemplary embodiment of FIG. 5 are placed at the end of the housing 522 for maximum cooling benefit, the hatchcover components 540 may be placed at other locations within the housing 522 and still receive sufficient cooling.

Attached to the hub 538 are the blades 524. In the present invention, the blades 524 are of a tapered, twisted, and curved design to maximize efficiency and stall characteristics, and to minimize noise. Although one embodiment uses this design, the invention will work with other blade designs.

Figure 6:
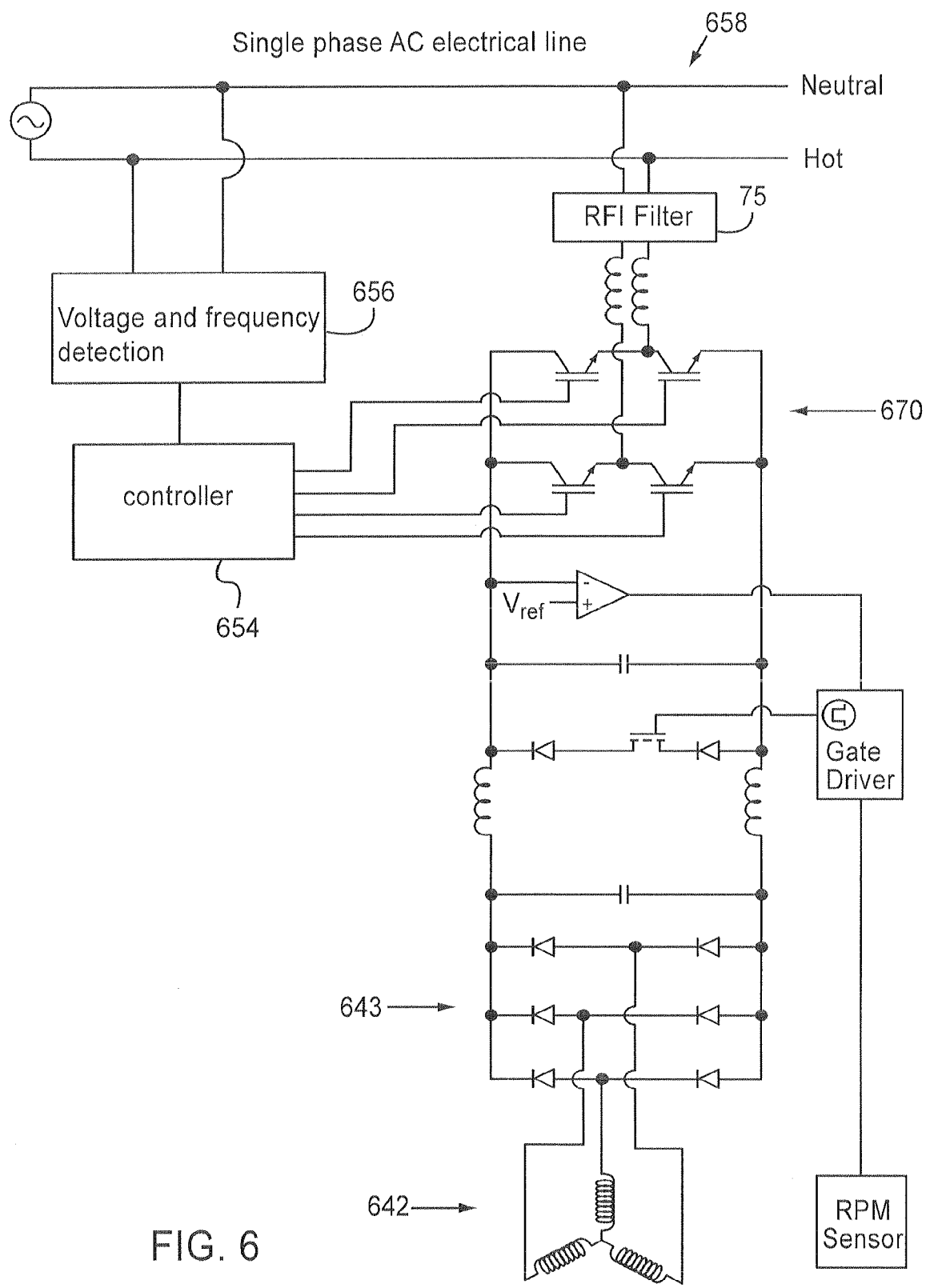
FIG. 6 is a block diagram of an exemplary inverter usable with embodiments of the present invention.

FIG. 6 shows a representative diagram of exemplary output conversion features for use in a wind turbine according to the present invention. In FIG. 6, the wind turbine's alternator 642 generates AC output at a varying frequency and voltage. The AC output from the alternator 642 is passed through an AC to DC converter 643, such as a rectifier, that includes one or more diodes. It should be noted that the exemplary AC to DC converter shown is a passive rectifier based on diodes, but other rectifiers or other circuits, such as bridges and active rectification, can be used with the present invention to perform similar functions.

Some of the features shown in FIG. 6 are similar to those described in U.S. Pat. No. 6,703,718 to Calley, et al., titled "WIND TURBINE CONTROLLER," the entirety of which is incorporated herein by reference. Also hereby incorporated by reference in their entirety are Applicant's copending U.S. Provisional Patent Application No. 60/699,940 filed Jul. 15, 2005, of David Calley titled "WIND TURBINE," and corresponding U.S. patent application Ser. No. 11/487,392 titled "WIND TURBINE AND METHOD OF MANUFACTURE" filed even herewith. The output from the wind turbine of FIG. 6 is passed through a DC to AC converter 670, such as an inverter, to convert the output to AC at a selected voltage and frequency. The inverter can be of any appropriate design, one example of which is shown in FIG. 6 as including four switch devices, such as junction transistors (e.g., NPN transistors). Other switch devices, such as field effect transistors (FETs), insulated gate bipolar transistors (IGBTs), metal oxide semiconductor field effect transistors (MOSFETs), gate turn-off silicon controlled rectifiers (GTOs), other transistor circuits or other devices, or some combination thereof, may similarly be used. The switch devices are controlled appropriately to create an approximation of a sine wave output, at the appropriate voltage and frequency.

In the exemplary embodiment shown in FIG. 6, the DC to AC converter can be a single-phase inverter for use with a single-phase electrical system, or a multiple-phase DC to AC converter for other electrical systems, such as 3-phase systems. The DC to AC converter may also include inductors or other devices to smooth the output from the converter. If the switch devices operate at sufficiently high speed, then the harmonic content of the resulting output may be low enough to allow omission of a filtering or other output smoothing device.

The switch devices in the DC to AC converter 670 are controlled by a controller 654. The controller 654 coordinates operation of the switches in the DC to AC converter 670 to produce AC output that is at the appropriate voltage and frequency for the AC line 658 or other output power receiving device or system to which the wind turbine is connected. Optionally, a voltage and frequency monitor 656 measures the voltage and frequency of the AC line 658 or other output power receiving device or system to which the wind turbine is connected, if applicable.

When the wind turbine according to the present invention is first connected to the AC power line 658 or other output power receiving device or system, for example, the controller 654 first measures the voltage, frequency, and phase angle of the receiving device or system. The controller 654 uses the measurement to control the operation of the switch devices in the DC to AC converter 670, such that the output of the wind turbine will be compatible with the AC power on the line 658 or other output power receiving device or system. A delay of up to several minutes may occur when the wind turbine of FIG. 6 is initially operated (e.g., as required for conformity to applicable safety standards), as the controller 654 performs a reliable measurement of the voltage, frequency, and phase angle of the AC line 658 or other output power receiving device or system to which power is to be conducted.

Figure 7:
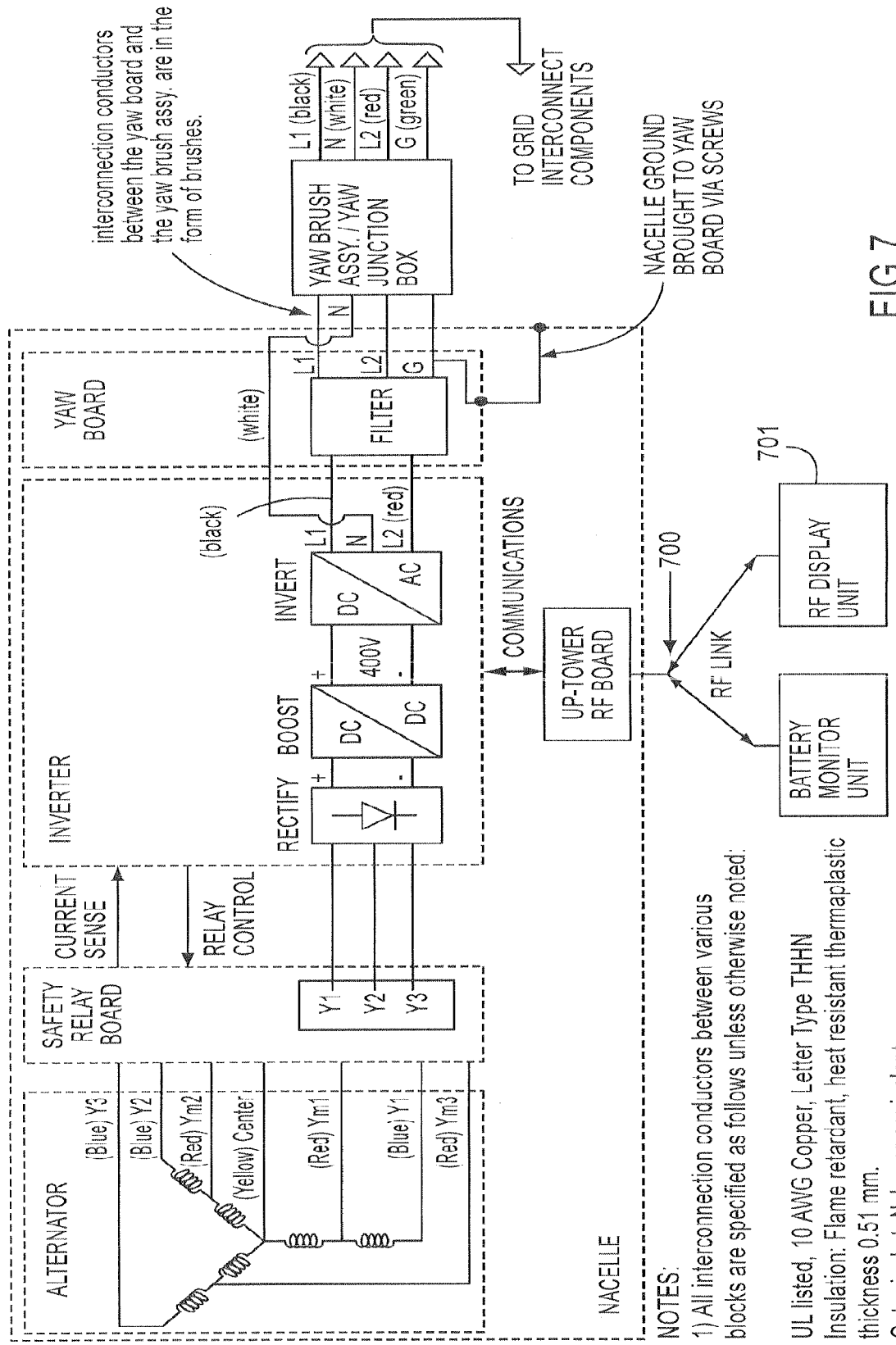
FIG. 7 presents a schematic of various components of an exemplary wind turbine, in accordance with an embodiment of the present invention.

FIG. 7 presents a schematic diagram of various components of an exemplary wind turbine, in accordance with another embodiment of the present invention, exemplary operation of which will now be described. As shown in FIG. 7, a radio frequency communication link 700 with the turbine control system is provided. This link 700 allows the user, such as at a RF display unit 701, to access information regarding turbine operation and output and to input information to control turbine operation. For example, the user may determine how much power is being output by the turbine and review prior output information (e.g., output over previous year or month). In one embodiment the RF link is used to transmit battery charge state information to a controller (e.g., located on or coupled to the up-tower RF board) so as to control alternator output to prevent battery charging upon full battery charging being completed. The RF link also may be used for other purposes, such as to uplink new programming (e.g., when updated software code for operation of a processor in the turbine is to be installed).

With regard to control of turbine operation, the user may be limited in control functions so as to prevent operation outside requirements of law or standards. For example, if the output of the turbine is to an AC grid having input requirements and limitations (e.g., minimum deviation from a required voltage and frequency of input to the grid), the system will not allow output to be delivered outside of those requirements. To ensure such requirements are met, the default for the turbine in one embodiment assumes connection to a grid. Such limitations are inapplicable if no standards apply (e.g., if output is to a closed system having user defined limitations).

Typical operations that a user may select include operational modes (e.g., slight power output reduction so as to reduce noise during nighttime operation)

Figure 8:
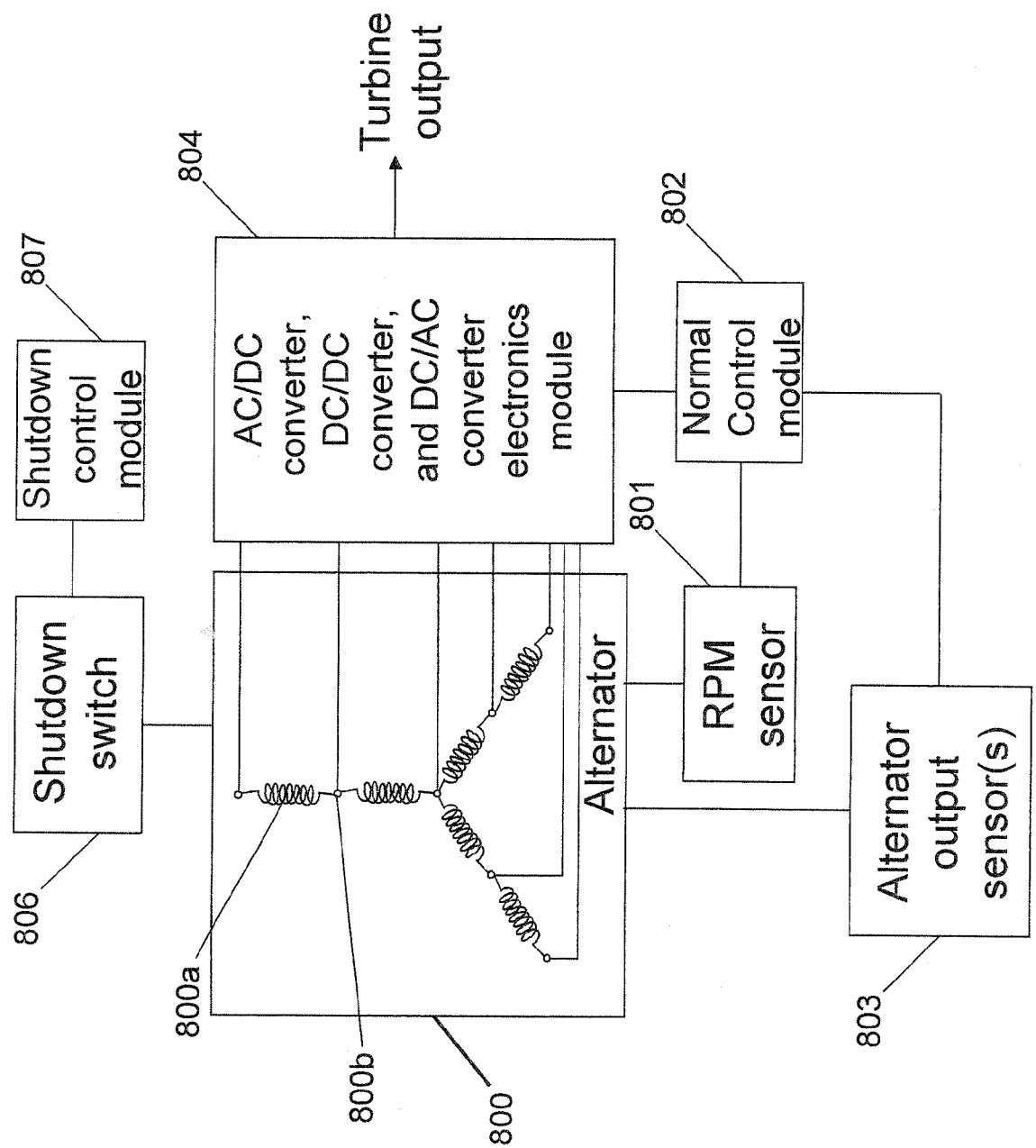
FIG. 8 contains a representative diagram of various components of an exemplary wind turbine, in accordance with another embodiment of the present invention.

FIG. 8 shows an exemplary diagram of various components of the present invention, in schematic form. The armature of the alternator 800 is shown as having six windings 800a, although other numbers of windings could also be used, and other circuit patterns, including, but not limited to the alternator windings circuitry shown in FIG. 4D. Each of the windings has an inherent resistance and inductance associated with it. The output of the armature of FIG. 8 is six phases of alternating current power. A rotational speed determiner 801, such as an RPM sensor, measures the rotational speed of the alternator 800 and optionally provides that information to a control module 802. This RPM information may be used, for example, to control power and/or RPM of the turbine. The RPM sensor may also simply observe the voltage or current produced by the winding(s) to provide the RPM signal (e.g., for display to the user). An AC/DC converter (in the AC/DC, DC/DC, and DC/AC converter electronics module 804) receives the alternating current from the armature and provides output, such as to an AC grid or to power applications. An alternator output determiner 803, such as a sensor for measuring various electrical properties of output from the alternator (e.g., current and voltage), is also provided to transmit that information to the control module 802. The control module 802 in turn provides information to the AC/DC, DC/DC, and DC/AC converter electronics module 804 to control operation of and output from the turbine.

As further shown in FIG. 8, a device for shorting 806, such as a latching relay, is also coupled to the AC/DC, DC/DC, and DC/AC converter electronics module 804 and to a shutdown control module 807. In the event of activation of the device for shorting 806, such as upon occurrence of certain predetermined triggering events (e.g., extreme high winds combined with main circuit failure), the device for shorting 806 implements a shorting across the windings 800a of the alternator 800. The shorting of the alternator windings 800a, in turn, creates torque via the alternator 800 sufficient to slow or stop wind turbine blade rotation. In an embodiment of the present invention, the torque produced by the shorting of the windings 800a is sufficiently high so that a significant portion of the windings 800a may fail (e.g., due to an open circuit in the windings or to one or more connectors for the windings), yet wind turbine blade rotation will still be slowed or stopped. In some embodiments, the shutdown circuit (comprising the device for shorting 806 and shutdown control module 807) constitutes a separate printed circuit board or other module from the other electronics of the wind turbine for maximum isolation (see, e.g., FIG. 1 and description relating thereto).

In the device of FIG. 8, if a change in the current or voltage of a winding 800a is determined, this may signal a complete failure, partial failure or irregularity in the alternator 800, for example. As a result of monitoring the connections, problems in any one of the windings 800a or primary circuit (e.g., AC/DC, DC/DC, and DC/AC converter electronics module 804) can be detected, and, for example, following a triggering event occurring, a signal can be transmitted to the device for shorting 806 to retard blade rotation.

In the example turbine shown in FIG. 8, the seven connection points 800b for the alternator windings 800a are monitored. Upon determination of an irregularity in any one of the seven connections, the shutdown control module 807, which is microprocessor-based, for example, disables the wind turbine by shorting the windings 800a of the alternator 800.

In one example of shorting the windings 800a, the shutdown control module 807 causes a device for shorting 806, such as a switch, a transistor, or the like to close a portion of the primary circuit (see, e.g., FIG. 1). The device for shorting 806 can be disposed after the AC to DC converter (e.g., in the circuit near the bridge rectifier 15, as shown in FIG. 1). The device for shorting 806 can also be disposed between the AC to DC converter and the alternator, for example.

In one embodiment of the present invention, 60% or more of the torque in the alternator 800 can be lost (e.g., four of six windings 800a failing), with sufficient torque remaining that is generatable from shorting the remaining windings 800a to decrease or stop wind turbine blade rotation or otherwise effectively control RPM during a wind event of up to about 140 mph or more.

As a result of the triggering event control features of the present invention, no additional mechanical parts are required for redundant control, such as those typically required to create variable pitch in other large (e.g., high power output between about 100 and 200 volts) wind turbines or furling or flutter for typical smaller (e.g., low power output between about 0-50 volts) wind turbines, for use in emergency conditions. Therefore, among other advantages, the cost, complexity, and required maintenance of the wind turbine of the present invention are not increased due to the inclusion of a separate redundant stopping mechanism. In addition, the triggering event control features of the present invention, unlike furling and aerolastic twisting of the prior art, produces no additional noise.

While the present invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

What is claimed is:

1. A wind turbine control and backup system, the system comprising:
    a control circuit connectable to a plurality of windings of an electrical output generating device for a wind turbine, wherein the control circuit operates the electrical output generating device at variable speed for controlling output from the wind turbine via aerodynamic stall; and
    a backup circuit coupled to the electrical output generating device for controlling operation of the wind turbine in an emergency condition via increasing current based torque opposing operation of the wind turbine.

2. The wind turbine of claim 1, wherein increasing current based torque opposing operation of the wind turbine includes:
    applying pulse width modulation to at least one of the plurality of windings of the electrical output generating device.

3. The wind turbine of claim 1, wherein increasing current based torque opposing operation of the wind turbine includes:
    shorting at least one of the plurality of windings of the electrical output generating device.

4. The wind turbine of claim 1, wherein the electrical output generating device is an alternator.

5. The wind turbine of claim 1, wherein the electrical power output device has a single phase.

\* \* \* \* \*